Patented Feb. 11, 1936

2,030,714

UNITED STATES PATENT OFFICE 2,030,714

ALKALI METAL VAPOR RESISTANT GLASS

Marcello Pirani, Berlin-Wilmersdorf, and Georg Gaidies, Berlin-Pankow, Germany, assignors to General Electric Company, a corporation of New York No Drawing. Original application February 10, 1932, Serial No. 592,137. Divided and this application March 21, 1933, Serial No. 661,926. In Germany February 18, 1931

3 Claims. (Cl. 106—36.1)

The present invention relates to glass compositions generally and more particularly the invention relates to such compositions which are resistant to the chemical effects of alkali metal vapor.

This application is a division of our co-pending application, Serial No. 592,137, filed February 10, 1932. In another co-pending application, Serial No. 470,436, filed July 24, 1930 we have described an alkali metal vapor resistant boro-silicate glass for use in the container of an electric discharge device having a filling of alkali metal vapor and particularly sodium vapor. Such glass contains in addition to the usual constituents of glass, as alkalies, alkali earths and aluminum oxide, not more than 50 per cent of silica and not less than 30% boric oxide. The following formula was given for the production of a suitable glass:—

| | Per cent |
|---|---|
| $Na_2O$ | 4 to 5 |
| $Al_2O_3$ | 11 to 13 |
| $CaO$ | 10 to 11 |
| $B_2O_3$ | 40 to 60 |
| $SiO_2$ | 10 to 26 | and the following composition was given for a particularly good glass:—

| | Per cent |
|---|---|
| $Na_2O$ | 4 |
| $Al_2O_3$ | 11 |
| $CaO$ | 9.6 |
| $B_2O_3$ | 49.6 |
| $SiO_2$ | 25.8 |

In making the above glasses the aluminum oxide has been added heretofore, as is customary in the glass industry, in the form of alumina, and the silica has been added heretofore in the form of commercial glass sand.

We have discovered that when such commercial materials are used in the production of alkali vapor resistant glass made in accordance with the above formula and having the above composition the container of an electric discharge device made of such glass and having an alkali metal vapor filling, while having sufficient chemical and heat resistivity for such purpose, has a tendency toward discoloration of the container walls after the electric discharge device has had a comparatively long operating life, this being true especially in containers having a small cross section.

The object of the present invention is to decrease the rate at which this discoloration of the walls of such a container of such an electric discharge device takes place. Still further objects and advantages attaching to the invention will be apparent to those skilled in the art from the following particular description.

The invention attains its object by using chemically pure silica and aluminum oxide in the production of alkali vapor resisting glass made in accordance with the formula given above in place of the commercial glass sand and alumina used heretofore. We have discovered that such commercial substances contain more or less iron oxide and this material incorporated in the walls of the container produces a discoloration thereof after the device has been operating for an appreciable time. We have discovered in addition that the iron oxide content of the glass mixture or of the molten glass mass must not exceed 0.1 per cent part by weight if discoloration of the walls of the container of the device is to be lessened during the operation of the device.

When desired, materials to effect the evaporation of the iron oxide, such as sodium chloride, is added to the molten mass of the glass batch to reduce the iron oxide content thereof instead of using chemically pure materials for such glass.

As the glass disclosed above is slightly hygroscopic it is desirable that the container of an electric discharge device made of such glass be protected from the surrounding atmosphere by a covering or casing made of a non-hygroscopic glass well known in the art, such as Thüringer glass, which has a better acid, lye and water stability than the boro-silicate glass of the present invention. Thüringer glass and the boro-silicate glass of this invention have approximately the same coefficients of expansion and are capable of being fused or fritted together to form a single walled two-layer container where that is desired.

While we have described and set forth processes for producing our improved product, it is obvious that various changes may be made in the processes or in the separate steps thereof without modifying or changing the essential features and characteristics of the product produced and that such product remains substantially the same.

What we claim as new and desire to secure by Letters Patent of the United States is:—

1. A new article of manufacture being a glass resistant to the chemical effects of alkali metal vapor and consisting of alkalies, alkali earths, aluminium oxide, not less than 30% boric oxide and not more than 50% silica and containing not more than 0.1% iron oxide.

2. A new article of manufacture being a glass made in accordance with the following formula: 4 to 5 $Na_2O$; 11 to 13 $Al_2O_3$; 10 to 11 CaO; 40 to 60 $B_2O_3$; 10 to 25 $SiO_2$, and containing not more than 0.1% iron oxide.

3. A new article of manufacture being a glass having the following composition: 4% $Na_2O$; 11% $Al_2O_3$; 9.6% CaO; 49.6% $B_2O_3$; 25.8% $SiO_2$, and containing not more than 0.1% iron oxide.

MARCELLO PIRANI.
GEORG GAIDIES.